(12) United States Patent
Cao

(10) Patent No.: US 10,027,221 B1
(45) Date of Patent: Jul. 17, 2018

(54) METHOD OF GENERATING A FEEDBACK SIGNAL IN A SWITCHING REGULATOR

(71) Applicant: Hua Cao, Leander, TX (US)

(72) Inventor: Hua Cao, Leander, TX (US)

( * ) Notice: Subject to any disclaimer, the term of this patent is extended or adjusted under 35 U.S.C. 154(b) by 0 days.

(21) Appl. No.: 15/704,938

(22) Filed: Sep. 14, 2017

(51) Int. Cl.
  *H02M 3/156* (2006.01)
  *H02M 1/088* (2006.01)
  *H02M 3/158* (2006.01)
  *H02M 1/00* (2006.01)

(52) U.S. Cl.
  CPC ............ *H02M 1/088* (2013.01); *H02M 3/158* (2013.01); *H02M 3/1563* (2013.01); *H02M 2001/0003* (2013.01)

(58) Field of Classification Search
  CPC ..................... H02M 3/1563; H02M 2001/0003
  See application file for complete search history.

(56) References Cited

U.S. PATENT DOCUMENTS

| | | | | |
|---|---|---|---|---|
| 9,030,177 B2* | 5/2015 | Nakashima | ......... | H02M 3/1588 323/271 |
| 2010/0102789 A1* | 4/2010 | Randall | ............... | H02M 3/1563 323/282 |
| 2014/0117961 A1* | 5/2014 | Rigoni | ................. | H02M 3/156 323/282 |

\* cited by examiner

*Primary Examiner* — Harry Behm

(57) ABSTRACT

A novel method to generate a feedback signal in a switching regulator is presented. The method includes the generation of a first feedback signal using the switching signal. The first feedback signal carries a ripple and the ripple is in phase with the switching signal. The first feedback signal does not use a control-in terminal PIN. The voltage level of the first feedback signal is regulated through a resistor and a capacitor connected between the switching node and the switching regulator controller. In an alternative method, a second feedback signal is generated using the regulator output voltage. The controller receives the second feedback signal through a control-in terminal PIN. In the alternative method, another resistor and another capacitor are used to connect the first feedback signal and the second feedback signal. Furthermore, the second feedback signal can adjust the regulator output voltage through two resistors connected in series. The subject invention is designed to operate in the Continuous Conduction Mode (CCM) where the load is significant and the inductor current remains positive during the entire switching period. The method is presented for buck switching regulators, and can be utilized also for boost, buck-boost, flyback, forward, and sepic, etc.

5 Claims, 6 Drawing Sheets

METHOD OF GENERATING A FEEDBACK SIGNAL IN A SWITCHING REGULATOR

BACKGROUND OF THE INVENTION

The subject invention relates to switching regulators or DC-DC converters where the input source of voltage is substantially fixed and the regulator output voltage is maintained at a substantially constant level.

Switching regulators or DC-DC converters, sometimes referred to as switching mode power supply, are used to convert an input supply voltage from the input terminals to a desired output voltage through output terminals. The output voltage can be maintained to have a substantially constant magnitude.

The low loss components in switching regulators such as capacitors, inductors, power switches, and transformers are alternatively turned on and off to transfer power from the input terminal to the output terminal in discrete packets. Feedback control circuits coupled to the control-in terminals are used to regulate and control the power. In some applications, the output voltage can be adjusted externally to a desirable level through at least one resistor coupled to the feedback signal which is generated from the regulator output voltage.

Continuous Conduction Mode (CCM) and Discontinuous Conduction Mode (DCM) are the two typical operation modes in switching regulators. The subject invention is designed to operate in the CCM mode where the load is significant and the inductor current remains positive during the entire switching period.

In modern switching regulator or DC-DC converter design, one of the challenging tasks is to generate a feedback signal without using the output voltage. The number of control-in terminal PINs can therefore be reduced without having to be used to connect the feedback signal to the main controller. Additionally, some applications require that the regulator output voltage must be able to be externally adjustable.

BRIEF SUMMARY OF THE INVENTION

It is therefore an objective of the subject invention to disclose a switching regulator that generates a first feedback using a switching voltage signal. The first feedback signal does not use the regulator output voltage and therefore does not need to be connected through a control-in terminal PIN.

In an embodiment of the subject invention, the voltage level of the first feedback signal is controlled through a resistor and a capacitor connected between the switching node and the main controller of the switching regulator. Another capacitor can be optionally connected to the first feedback signal for the purpose of making an adjustment of the first feedback signal. The main controller of the switching regulator contains a logic and driver block controlling the switching operations of a high-side power switch and a low-side power switch.

In an alternative embodiment of a buck switching regulator, according to the subject invention, a second feedback signal is generated using the switching regulator output voltage. The main controller receives the second feedback via a control-in terminal PIN. In the alternative method, another resistor and another capacitor are used to connect the first feedback signal and the second feedback signal for the purpose of adjusting the first feedback signal. Additionally, the regulator output voltage can be adjusted externally through two resistors connected in series on the second feedback signal.

The foregoing and a better understanding of the present subject invention will become apparent from the following detailed description of example embodiments and the claims when read in connection with the accompanying drawings, all forming a part of the disclosure of this subject invention. As will be realized, the subject invention is capable of other and different embodiments, and its several details are capable of modifications in various obvious respects, all without departing from the present subject invention. Accordingly, the drawings and description are to be regarded as illustrative in nature, and not as restrictive.

BRIEF DESCRIPTION OF DRAWINGS

It is understood that other embodiments of the subject invention will become readily apparent to those skilled in the art from the following detailed description, wherein it is shown and described only various embodiments of the invention by way of illustration. In the drawings, like reference numbers generally indicate identical, functionally similar, and/or structurally similar elements. While the foregoing and following written and illustrated disclosure focuses on disclosing example embodiments of the subject invention, it should be understood that the same is by way of illustration and example only and the invention is not limited thereto. The following represents brief descriptions of the drawings, wherein.

DETAILED DESCRIPTION OF THE INVENTION

It is understood that other embodiments of the present subject invention will become readily apparent to those skilled in the art from the following detailed description of example embodiments and the claims, wherein it is shown and described only various embodiments of the invention by way of illustration. The invention can be implemented in numerous ways, including as a process, an apparatus, a system, or a composition of matter. In this specification, these implementations, or any other form that the invention may take, may be referred to as techniques. In general, the order of the steps of disclosed processes may be altered within the scope of the subject invention.

The detailed description set forth below in connection with the appended drawings is intended as a description of exemplary embodiments of the subject invention and is not intended to represent the only embodiments in which the subject invention can be practiced. The term "exemplary" means "serving as an example, instance, or illustration," and should not necessarily be construed as preferred or advantageous over other alternative embodiments. The detailed description includes specific details for the purpose of providing a thorough understanding of the subject invention. However, it will be apparent to those skilled in the art that the subject invention may be practiced without these specific details. In some instances, well-known structures and devices are shown in block diagram form in order to avoid obscuring the concepts of the subject invention. These structures and devices, as well as other blocks, modules, and circuits may be "coupled" or "connected" together to perform various functions. The term "coupled" or "connected" mean either a direct connection, or where appropriate, an indirect connection.

Figure 1:
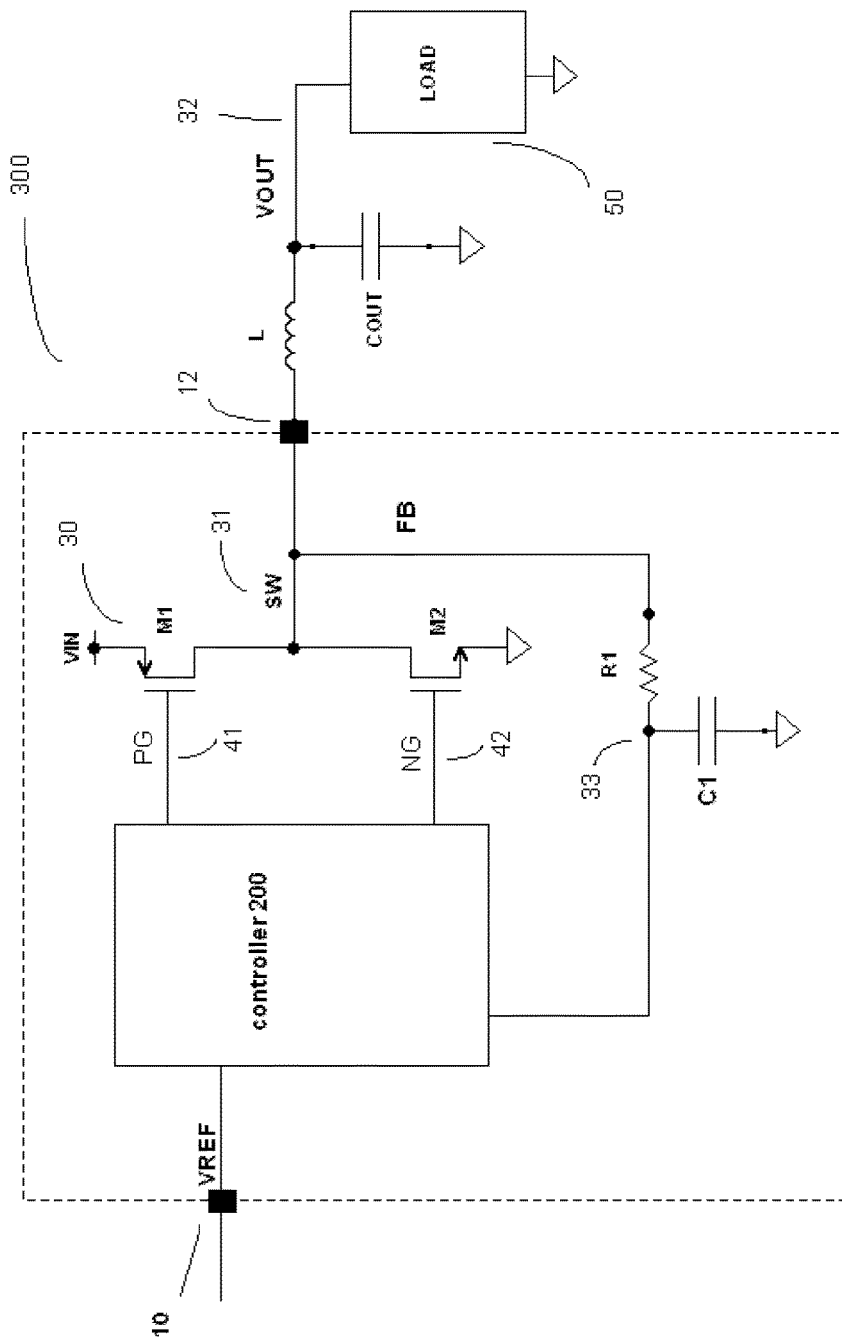
FIG. 1 is a schematic diagram of a first feedback generation circuit in the switching regulator according to a first embodiment of the subject invention.

FIG. 1 is a schematic diagram illustrating an embodiment of a buck switching regulator according to the subject invention. A switching regulator 300 in FIG. 1 is shown as a buck switching regulator. However, the various concepts described throughout this disclosure may be extended to other switching regulators, such as boost, buck-boost, flyback, forward, sepic, etc. as well as other suitable applications. Also, the control method can be used for both synchronous and nonsynchronous switching regulators. Referring to FIG. 1, a switching regulator 300 includes a switching regulator controller 200 and two power switches M1 and M2. The power switch M1 is also referred as a high-side power switch. The power switch M2 is also referred as a low-side power switch. In FIG. 1, the power switch M1 is a PMOS FET transistor and the power switch M2 is a NMOS FET transistor. In some other applications, the power switch M1 could be a NMOS transistor. The power switches M1 and M2 are connected in series between an input voltage VIN at node 30 and a ground potential. The power switches M1 and M2 are alternately turned on and off to generate a switching output signal SW at node 31. The switching operation of M1 and M2 are controlled by the output signals of the controller 200. The output signal PG controls power switch M1 at node 41. The output signal NG controls power switch M2 at node 42. The power switch M1 is coupled between the input voltage VIN at node 30 and the switching node SW at node 31. The power switch M2 is coupled between ground and switching node SW. The gates of M1 and M2 are coupled to the switching regulator controller 200. The switching node SW is coupled through a gate-out terminal PIN 12 to an output LRC filter circuit including an output inductor L and an output capacitor COUT. The output voltage VOUT can be used to drive a load 50 whereby switching regulator 300 provides current to maintain the output voltage VOUT at a constant voltage level.

Referring to FIG. 1, the FB signal is a feedback signal generated from the switching voltage signal at the switching node SW. The voltage level of the FB signal carries a ripple and the ripple is in phase with the switching voltage signal. The FB signal generation circuit includes a resistor R1 and a capacitor C1. The resistor R1 is coupled to the switching node SW. The capacitor C1 is coupled between the resistor R1 and a ground potential. The signal at the common node 33 of R1 and C1 is the feedback signal FB which is coupled to the input terminal of the controller 200. The FB signal does not use the regulator output voltage VOUT. The FB signal does not occupy a control-in terminal PIN of the switching regulator 300. In FIG. 1, VREF is a reference signal connected to the controller 200 through a gate-in terminal PIN 10. VREF represents one or multiple reference signals. VREF also represents one or multiple types of reference signals. In case of more than one reference signal is presented in some applications, the switching regulator 300 needs more than one gate-in terminal PINs to connect the multiple reference signals to the switching regulator 300.

Figure 2:
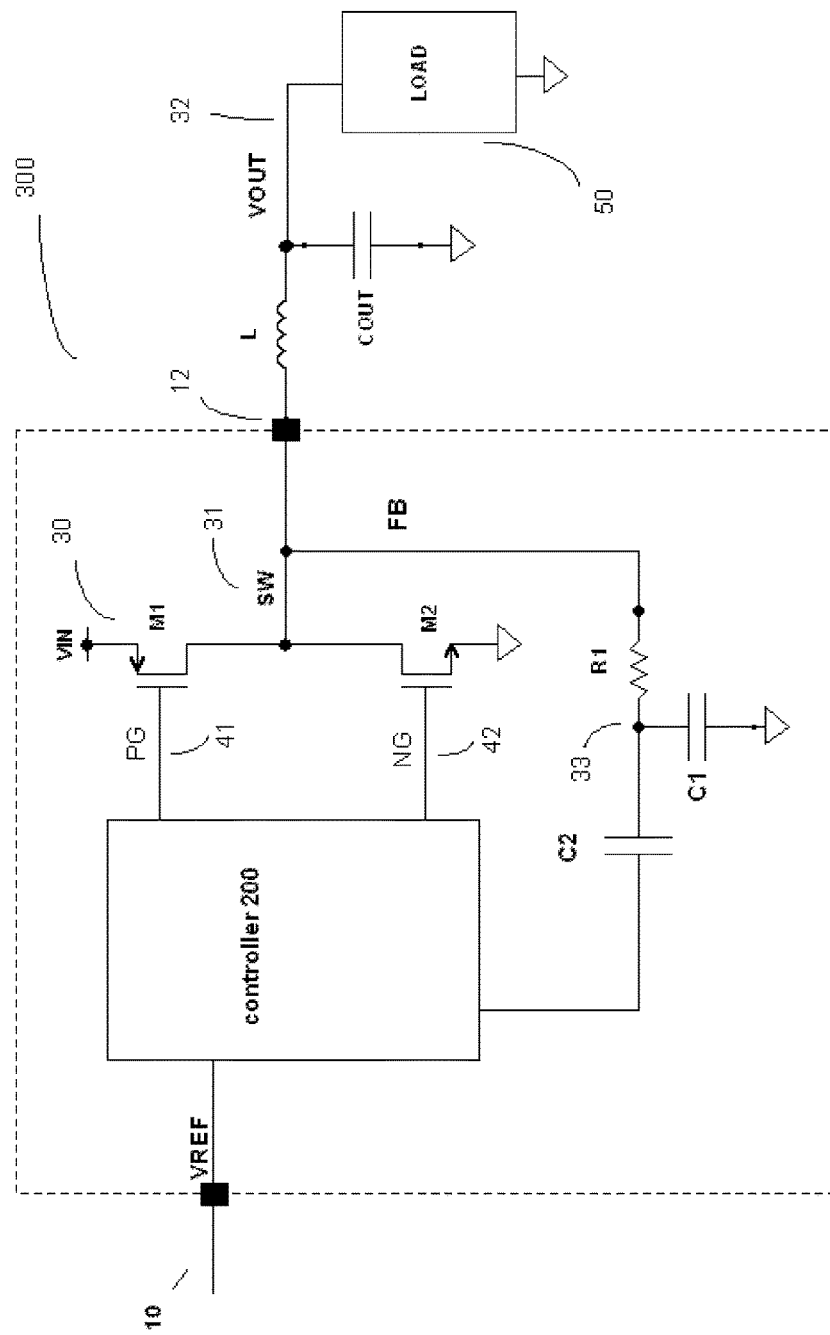
FIG. 2 is a schematic diagram according to an alternative embodiment of the first feedback generation method disclosed in FIG. 1.

FIG. 2 is a schematic diagram of a switching regulator 300 according to another embodiment of the subject invention where the feedback FB generation circuit in FIG. 1 is modified by adding a capacitor C2. Referring to FIG. 2, the switching regulator 300 is similar to the switching regulator 300 in FIG. 1. It includes a switching regulator controller 200 and two power switches M1 and M2 coupled to the output LC filter circuit which includes an output inductor L and an output capacitor COUT. The capacitor C2 is coupled to the controller 200 and to the common node 33 of resistor R1 and capacitor C1. The capacitor C2 is optional and may be omitted in other embodiments. The feedback signal FB has approximately triangle waveform similar to the waveform of the switching signal and the inductor current IL. The FB signal is in phase with the switching signal SW and the inductor current IL.

Figure 3:
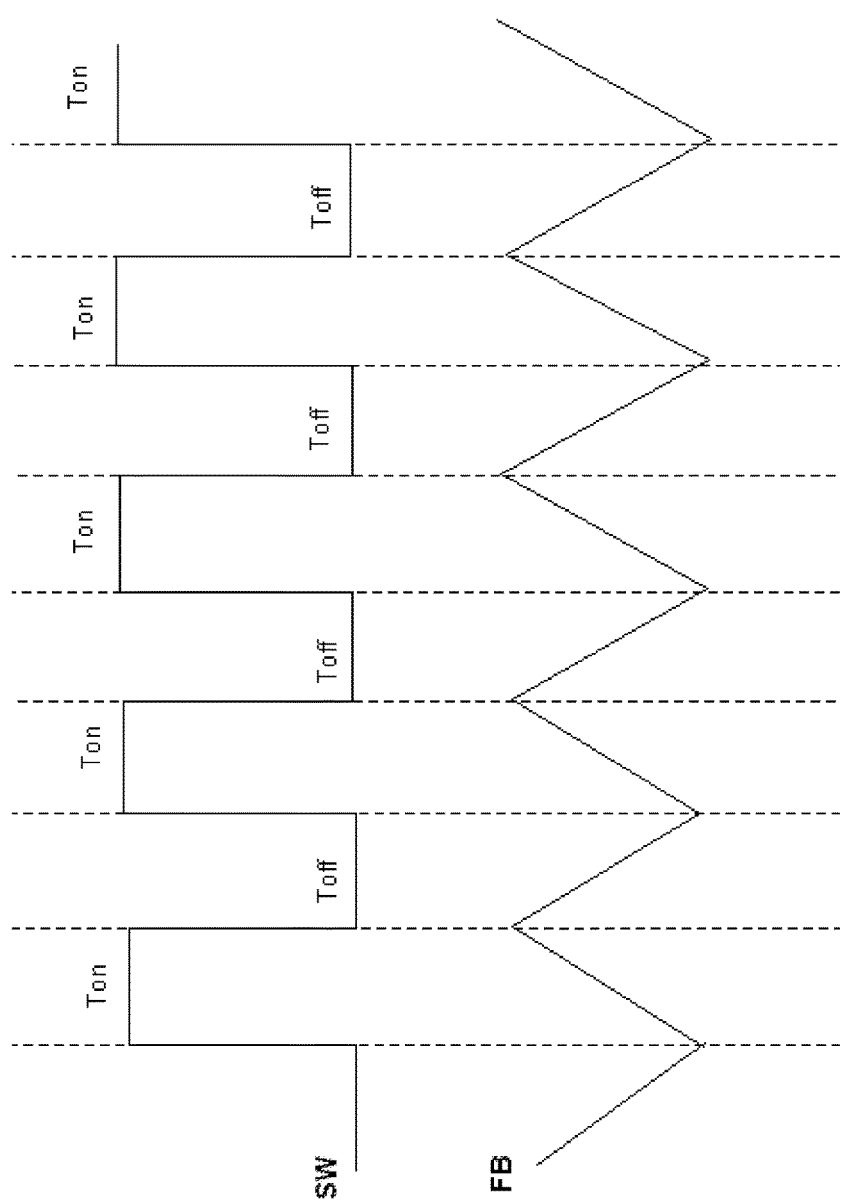
FIG. 3 is a diagram illustrating waveforms of the switching voltage signal and the first feedback signal disclosed in FIG. 1 and FIG. 2

FIG. 3 is a diagram illustrating waveforms of the feedback signal FB and the switching voltage signal SW in FIG. 1 and FIG. 2. In FIG. 3, the voltage level of the FB signal carries a ripple and the ripple is in phase with the switching voltage signal SW. The feedback signal FB has approximately triangle waveform similar to the waveform of the switching signal SW and the inductor current IL and is in phase with the switching signal SW and the inductor current IL. When the high side power switch M1 turns on and the low side power switch M1 turns off, the switching signal SW remains high during the period of Ton. The voltage level of the FB signal then ramps up with a positive slope. When the high side power switch M1 turns off and the low side power switch M1 turns on, the switching signal SW remains low during the period of Toff. The voltage level of the FB signal then ramps down with a negative slope.

Figure 4:
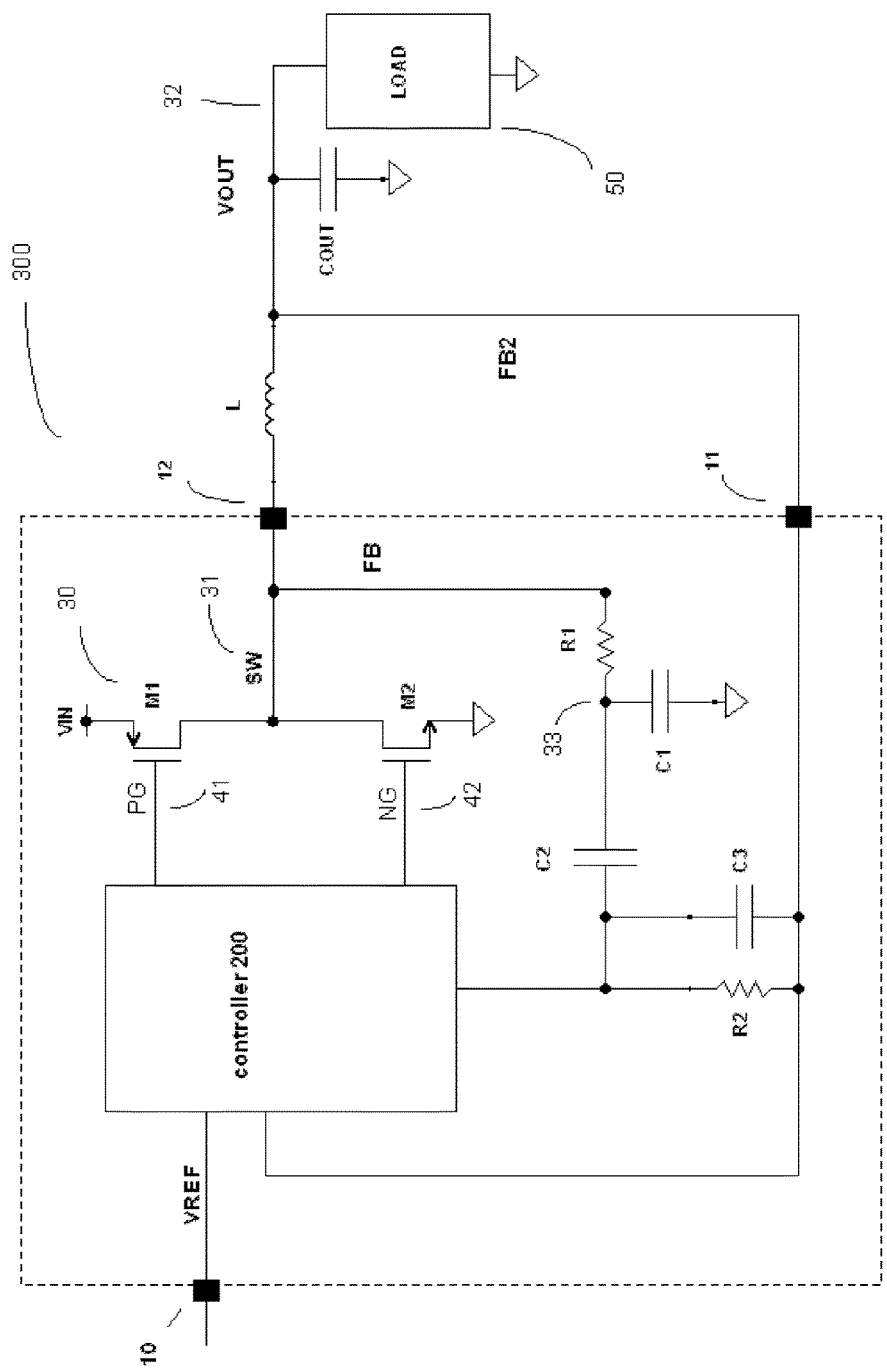
FIG. 4 is a schematic diagram of a switching regulator according to an alternative embodiment where a second feedback signal is generated using the regulator output voltage and connected to the first feedback signal through a resistor and a capacitor.

FIG. 4 is a schematic diagram of a switching regulator 300 according to another embodiment of the subject invention in FIG. 2. Referring to FIG. 4, the switching regulator 300 is similar to the switching regulator 300 in FIG. 2. It includes a switching regulator controller 200 and two power switches M1 and M2 coupled to the output LC filter circuit which includes an output inductor L and an output capacitor COUT. The FB and FB2 signals are two feedback signals. A second feedback generation circuit receives the regulator output voltage VOUT signal and generates the second feedback signal FB2. The voltage level of the FB2 signal is proportional to the voltage level of the VOUT signal. The FB2 signal is connected to the controller 200 in the switching regulator 300 through a control-in terminal PIN 11. The resistor R2 and the capacitor C3 are connected in parallel between the FB signal and the FB2 signal. Resistor R2 and Capacitor C3 are optional and may be omitted in other embodiments.

Figure 5:
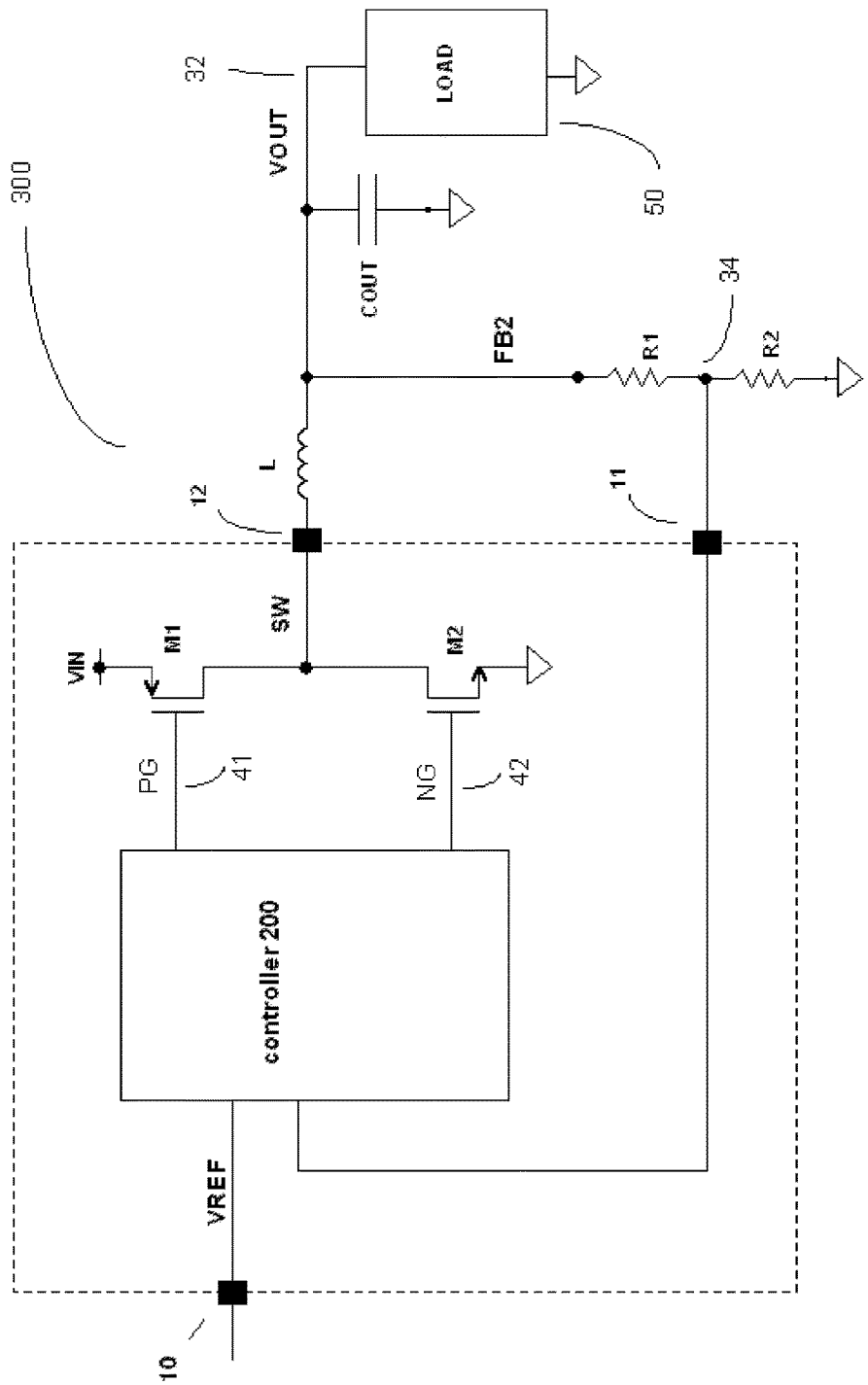
FIG. 5 is a schematic diagram of a known buck switching regulator where the regulator output voltage can be adjusted through two resistors connected in series to the second feedback signal.

FIG. 5 (Prior Art) is a schematic diagram showing a known buck switching regulator with an adjustable output voltage. The output voltage of the switching regulator 300 is controlled by two resistors R1 and R2, where R1 and R2 are connected in series. A feedback signal FB2 is generated and coupled to the common node 34 between R1 and R2 and connected to a control-in terminal PIN 11 of the switching regulator 300. The feedback signal FB2 uses the regulator output voltage VOUT. The size of R1 and R2 determines the VOUT voltage level.

Figure 6:
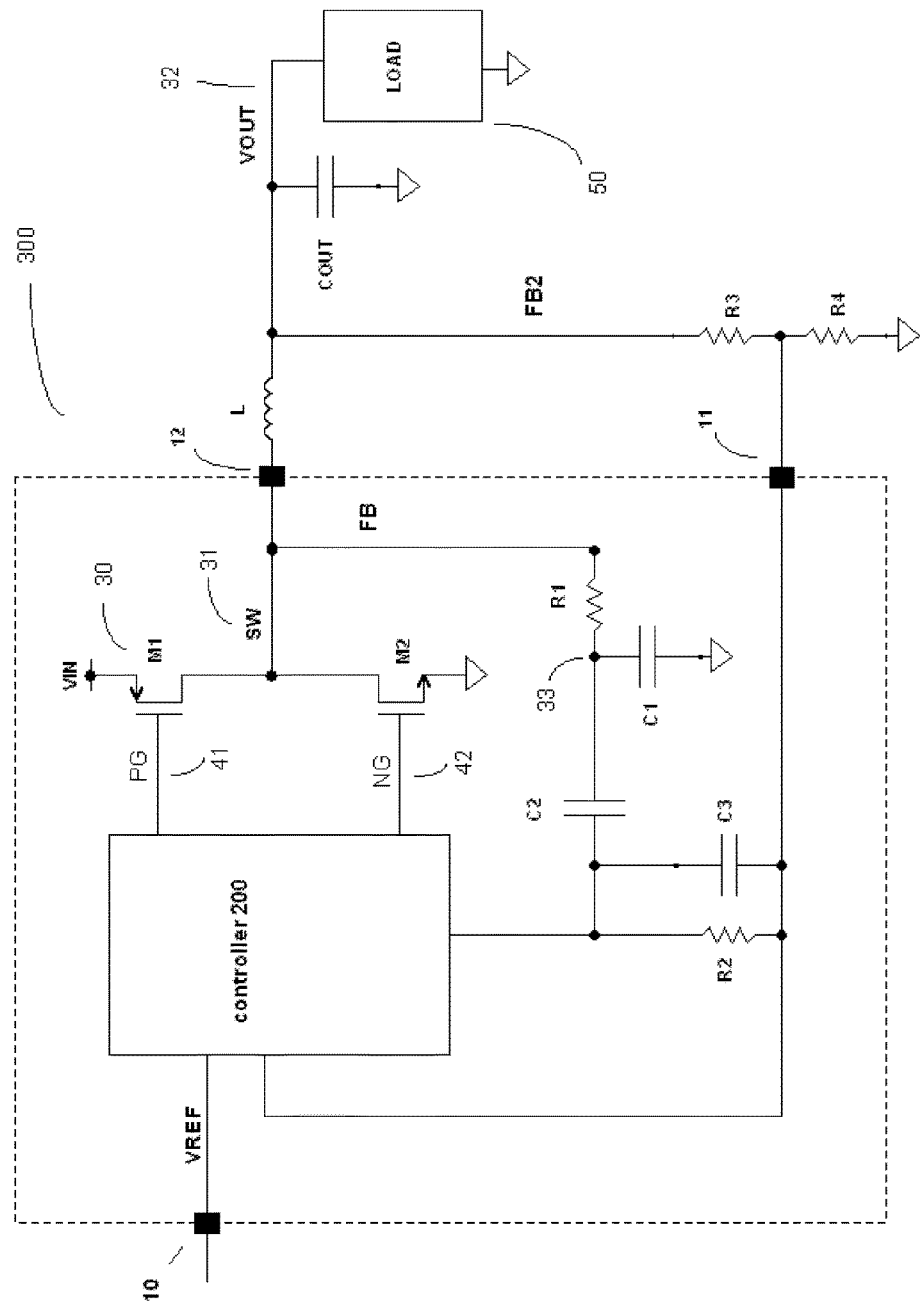
FIG. 6 is a schematic diagram of a switching regulator according to an alternative embodiment of the subject invention of FIG. 2, FIG. 4, and FIG. 5.

FIG. 6 is a schematic diagram illustrating an alternative embodiment of a buck switching regulator according to the subject invention in FIG. 2, FIG. 4, and FIG. 5. Referring to FIG. 6, a switching regulator 300 includes a switching regulator controller 200 and two power switches M1 and M2. The power switch M1 is coupled between the input voltage VIN at node 30 and a switching node SW at node 31. The power switch M2 is coupled between ground and switching node SW. The gates of M1 and M2 are coupled to the switching regulator controller 200. The switching node SW is coupled to an output LRC filter circuit including an output inductor L and an output capacitor COUT. The first feedback signal FB can be generated using the switching signal as illustrated in FIG. 1 or in FIG. 2. The second feedback signal FB2 can be generated using the regulator output voltage VOUT as illustrated in FIG. 5. The controller 200 receives the FB signal without using a control-in terminal PIN. The FB and FB2 are connected through a resistor R2 and a capacitor C3. The resistor R2 and the capacitor C3 are connected in parallel between the FB signal and the FB2 signal. R3 and R4 are two resistors connected in series between the output voltage at the output node 32 and the ground potential. The regulator output voltage VOUT is adjustable through changing the size of R3 or/and R4.

The described embodiments in this subject invention can be used in all the switching regulators, such as boost, buck-boost, flyback, forward, sepic, etc. The invention is capable of other and different embodiments and its several details are capable of modification in various other respects, all without departing from the spirit and scope of the subject invention. Accordingly, the disclosed embodiments, drawings, and detailed description are to be merely regarded as illustrative in nature and not restrictive.

What is claimed is:

1. A switching regulator configured to receive an input voltage and to generate a switching regulator output voltage; and said switching regulator controlling a high-side power switch and a low-side power switch to drive a switching node for generating a switching voltage signal; and said switching node being coupled to an LC filter to generate said regulated output voltage on an output node of said switching regulator; and said switching regulator comprising:
    a voltage reference signal;
    a first feedback generation circuit configured to generate a first feedback signal using said switching voltage signal; wherein said first feedback signal having no use of said switching regulator output voltage;
    a controller configured to receive said first feedback signal having no use of a control-in terminal PIN;
    wherein said controller further configured to receive said voltage reference signal and to generate control signals of said high-side power switch and said low-side power switch;
    wherein said first feedback signal generation circuit comprises: a first resistor coupled to said switching node; a first capacitor connected between said first resistor and a first ground potential; a second capacitor connected between said first capacitor and said controller;
    a second feedback generation circuit configured to generate a second feedback signal using said switching regulator output voltage, said second feedback signal being proportional to said switching regulator output voltage;
    wherein said controller is further configured to receive said second feedback through said control-in terminal PIN and to generate control signals of said high-side power switch and said low-side power switch;
    wherein said second feedback signal generation circuit comprises: a third capacitor connected between said first feedback signal and said second feedback signal; a second resistor connected in parallel with said third capacitor between said first feedback signal and said second feedback signal.

2. Said switching regulator of claim 1, wherein said first feedback signal carrying a ripple and said ripple being in phase with said switching voltage signal.

3. Said switching regulator as in claim 1, wherein said second feedback signal generation circuit further comprises:
    a third resistor and a fourth resistor connected in series between said output node of said switching regulator and a second ground potential;
    wherein said second feedback signal is coupled between said third resistor and said fourth resistor.

4. A method in a switching regulator receiving an input voltage and controlling a high-side power switch and a low-side power switch to drive a switching node for generating a switching voltage signal; and said switching node being coupled to an LC filter circuit to generate a regulated regulator output voltage on an output node of said switching regulator; said method comprising:
    generating a voltage reference signal;
    generating a first feedback signal using said switching voltage signal, wherein said first feedback signal having no use of said regulator output voltage;
    controlling said high-side power switch and said low-side power switch by receiving said first feedback signal having no use of a control-in terminal PIN and said voltage reference signal through a controller to regulate said regulator output voltage;
    regulating said first feedback signal through a first resistor and a first capacitor;
    adjusting said first feedback signal through a second capacitor;
    generating a second feedback signal using said switching regulator output voltage;
    wherein said second feedback signal being proportional to said regulator output voltage;
    controlling said high-side power switch and said low-side power switch by receiving said voltage reference signal and said first feedback signal and said second feedback signal through said control-in terminal PIN to regulate said regulator output voltage;
    adjusting said first feedback signal by a third capacitor and a second resistor coupled between said first feedback signal and said second feedback signal;
    wherein said second resistor connected in parallel with said third capacitor between said first feedback signal and said second feedback signal.

5. Said method of claim 4, wherein said first feedback signal carrying a ripple and said ripple being in phase with said switching voltage signal.

* * * * *